(12) United States Patent
Schaaf et al.

(10) Patent No.: US 9,371,849 B2
(45) Date of Patent: Jun. 21, 2016

(54) CORNER CONNECTOR FOR HOLLOW PROFILES

(75) Inventors: Igor Harry Schaaf, Rheinmuenster (DE); Paul Mazura, Karlsbad (DE); Walter Nicolai, Buseck (DE); Simon Jocham, Munich (DE)

(73) Assignee: C E S CONTROL ENCLOSURE SYSTEMS GMBH, Bad Homburg v.d. Hoehe (DE)

( * ) Notice: Subject to any disclaimer, the term of this patent is extended or adjusted under 35 U.S.C. 154(b) by 212 days.

(21) Appl. No.: 14/001,231

(22) PCT Filed: Feb. 22, 2012

(86) PCT No.: PCT/EP2012/000767
§ 371 (c)(1),
(2), (4) Date: Oct. 24, 2013

(87) PCT Pub. No.: WO2012/113549
PCT Pub. Date: Aug. 30, 2012

(65) Prior Publication Data
US 2014/0294500 A1    Oct. 2, 2014

(30) Foreign Application Priority Data

Feb. 25, 2011  (DE) .......................... 10 2011 012 433
Feb. 25, 2011  (DE) .......................... 10 2011 012 434
Feb. 25, 2011  (DE) .......................... 10 2011 012 435
Feb. 25, 2011  (DE) .......................... 10 2011 012 436

(51) Int. Cl.
*F16B 7/00*  (2006.01)
*F16B 7/04*  (2006.01)
(Continued)

(52) U.S. Cl.
CPC ............. *F16B 7/0446* (2013.01); *F16B 7/0453* (2013.01); *H02B 1/28* (2013.01);
(Continued)

(58) Field of Classification Search
CPC .............. Y10T 403/341; Y10T 403/44; Y10T 403/443; Y10T 403/7096; F16B 7/02; F16B 7/0453; F16B 7/0466; F16B 7/185; H02B 1/013; H02B 1/014; H02B 1/301; H02B 1/28; A47B 47/0008; A47B 47/0016; E04B 1/5831
See application file for complete search history.

(56) References Cited

U.S. PATENT DOCUMENTS 2,018,539 A  * 10/1935  Welsh .......................... 403/218
2,446,336 A     8/1948  Mark et al.
(Continued)

FOREIGN PATENT DOCUMENTS

CN    201752064 U    2/2011
DE    1936096 A1    6/1970
(Continued)

OTHER PUBLICATIONS

International Search report issued in corresponding application No. PCT/EP2012/000767 mailed May 22, 2012.
(Continued)

*Primary Examiner* — Michael P Ferguson
*Assistant Examiner* — Matthew R McMahon
(74) *Attorney, Agent, or Firm* — Carter, DeLuca, Farrell & Schmidt, LLP (57) ABSTRACT

A corner connector for hollow profiles is provided, including a base element having a first and a second wall section connected at a right angle and in one piece to each other on one respective lateral edge that forms a connecting edge, a first guide and connection groove extends from a lateral edge that is adjacent and in parallel to the connecting edge, and at least one essentially plate-shaped, rectangular additional element, wherein two guide and connection projections protrude from its inner side complementary to the first guide and connection grooves which can be inserted into the first guide and connection grooves in a direction parallel to the connecting edge and, in the fully inserted position, secure the additional element flush on the base element in order to form a third wall section arranged at a right angle to the first and the second wall section.

15 Claims, 4 Drawing Sheets

(51) Int. Cl.
  H02B 1/28 (2006.01)
  H02B 1/30 (2006.01)
  *A47B 47/00* (2006.01)
  *E04B 1/58* (2006.01)
  *H02B 1/01* (2006.01)

(52) U.S. Cl.
  CPC ............ *H02B 1/301* (2013.01); *A47B 47/0008* (2013.01); *A47B 47/0016* (2013.01); *E04B 1/5831* (2013.01); *H02B 1/013* (2013.01); *Y10T 403/341* (2015.01); *Y10T 403/44* (2015.01); *Y10T 403/73* (2015.01)

(56) References Cited

U.S. PATENT DOCUMENTS

| | | | | |
|---|---|---|---|---|
| 3,182,846 | A | * | 5/1965 | La Kaff ........................ 220/4.28 |
| 3,542,407 | A | * | 11/1970 | Brown ............... A47B 47/0008 403/172 |
| 3,834,549 | A | * | 9/1974 | Burg et al. .................... 211/189 |
| 4,128,353 | A | * | 12/1978 | Lauterbach .................... 403/175 |
| 4,610,561 | A | * | 9/1986 | Cecchellero .......... E04B 1/1912 403/171 |
| 4,678,359 | A | * | 7/1987 | Keen ........................... 403/170 |
| 4,726,701 | A | * | 2/1988 | Thomas ............... F16B 7/0446 403/172 |
| 5,008,485 | A | | 4/1991 | Kitagawa |
| 5,202,818 | A | | 4/1993 | Betsch et al. |
| 5,321,928 | A | | 6/1994 | Warneke |
| 5,775,051 | A | | 7/1998 | Nicolai et al. |
| 6,128,876 | A | * | 10/2000 | Nitschke et al. ............. 52/239 |
| 6,231,142 | B1 | * | 5/2001 | Pochet ...................... 312/265.3 |
| 6,270,283 | B1 | * | 8/2001 | Turati ........................... 403/217 |
| 6,561,555 | B1 | | 5/2003 | Millard |
| 6,591,571 | B2 | * | 7/2003 | Fritsche et al. ............. 52/655.1 |
| 7,267,378 | B2 | | 9/2007 | Drumm |
| 8,196,758 | B2 | * | 6/2012 | Lee ............................... 211/26 |
| 8,365,929 | B2 | * | 2/2013 | Luo ............................. 211/183 |
| 8,403,431 | B2 | * | 3/2013 | Elkins et al. .............. 312/265.1 |
| 2009/0260311 | A1 | | 10/2009 | Boyer et al. |
| 2010/0000157 | A1 | | 1/2010 | Cotlet et al. |
| 2011/0272895 | A1 | | 11/2011 | Kritzer et al. |

FOREIGN PATENT DOCUMENTS

| | | |
|---|---|---|
| DE | 19528362 A1 | 2/1996 |
| DE | 102008020148 A1 | 10/2008 |
| EP | 0330758 A1 | 9/1989 |
| EP | 1 130 275 A1 | 9/2001 |
| EP | 1659250 A1 | 5/2006 |
| FR | 2 674 581 A1 | 10/1992 |
| WO | 2005052416 A1 | 6/2005 |
| WO | WO 2009084260 A1 * | 7/2009 ................ E04B 2/76 |

OTHER PUBLICATIONS

International Search Report issued in corresponding application No. PCT/EP2012/000769 mailed Jul. 3, 2012.
International Search Report issued in corresponding application No. PCT/EP2012/000768 mailed Jun. 28, 2012.

* cited by examiner

CORNER CONNECTOR FOR HOLLOW PROFILES

The invention relates to so-called corner connectors for hollow profiles.

Hollow profiles, which can consist of metal or plastic, for example, are suitable for the production of frames and racks, such as are required in various application areas, for instance in the electrical industry (e.g. as frame elements for switch cabinets), in machinery and plant manufacture (as a machine base frame, for instance, or the like), or also in the furniture industry (for shelving systems and the like, for instance). Hollow profiles of the said type can be formed from sheet metal, but they can also be continuous casting parts (of aluminum or a plastic, for instance). Regardless of the nature of their manufacture and the material that they consist of, the normally elongated hollow profiles must be connected at their ends to further hollow profiles, however, in order to form a frame, a rack or similar, for example. It is known in this context, for example, to weld the ends of hollow profiles to be joined to one another in the desired geometrical orientation in order to achieve a sturdy corner connection. Such welding is evidently labor-intensive and time-consuming.

The object of the invention is to specify an improved option for connecting hollow profiles via a corner, which is possible without welding, can easily be undone again and nevertheless meets high stability demands, requires little assembly time and can be used flexibly.

To achieve this object, a corner connector for hollow profiles is provided including a base element, which has a first and a second wall section, each wall section being substantially plate-shaped and rectangular. Each wall section has four lateral edges, an inner side and an outer side. The first and the second wall section are connected at a right angle and in one piece to each other on one respective lateral edge that forms a connecting edge, for example by welding, mold casting, edge fusion or any other type of manufacturing or connecting that results in a connection of the two wall sections in one piece. On their inner side, the first and the second wall section are each provided with a first guide and connection groove, which extends from a lateral edge adjacent to the connecting edge in a direction parallel to the connecting edge. These guide and connection grooves can be introduced into the two wall sections retrospectively, for instance by machining or erosion machining, but they can also arise directly in the production of the base element, for example by suitable forming of a casting mold.

The corner connector according to the invention further has at least one substantially plate-shaped, rectangular additional element, which likewise has four lateral edges, an inner side and an outer side. Protruding from the inner side of the additional element are two guide and connection projections that are complementary to the first guide and connection grooves and can be inserted into the first guide and connection grooves of the base element in a direction parallel to the connecting edge of the base element, and which in the fully inserted position secure the additional element flush on the base element to form a third wall section, which is arranged at a right angle to the first and second wall section. The additional element or each additional element can be manufactured in the same way as indicated above for the base element and can consist of the same material as the base element or of a different material. If the base element is executed very stably, for example, the additional element possibly needs to be less stable depending on the application and can consist of a different material than the base element if applicable. In preferred configurations of the present invention, however, base and additional element consist of the same material.

The corner connector constructed according to the invention offers the possibility of connecting stably two, three or even four hollow profiles in an arrangement at a right angle to one another in each case on the outer sides of the wall sections, for example by screwing to the corner connector. In the fully inserted state, the additional element, which can only be inserted into the base element in one direction parallel to the connecting edge, forms with the base element a sturdy connection block that can be easily assembled and dismantled. The first guide and connection grooves are preferably formed with an undercut, for example in the shape of a dovetail groove. The first guide and connection grooves can also be executed so that with the increasing introduction of the guide and connection projections a clamping effect results, which fixes the additional element securely to the base element without further precautions. "Secured flush" means here that the additional element forms the third (or fourth) wall of a cube- or rectangular-shaped corner connecting block in the fully inserted state. The wall sections of the base element and the additional elements are square in a preferred configuration, and the resulting corner connector is accordingly cuboid in its basic shape.

Although a centering of the additional element with reference to the base element can already be achieved by the interaction of the first guide and connection grooves with the guide and connection projections, in a preferred embodiment of the corner connector a centering opening exists in the base element close to the connecting edge, which opening runs parallel to the connecting edge and preferably tapers conically, in which a preferably likewise conical centering projection that is aligned with the centering opening and protrudes from the inner side of the additional element engages on insertion of the additional element into the base element. The centering projection is executed complementarily to the centering opening and ensures that the lateral edges of the additional element run exactly parallel to the adjacent lateral edges of the base element. In embodiments of the corner connector according to the invention, which comprise the centering opening and the centering projection that interacts with it, the first guide and connection grooves interact with the guide and connection projections preferably not in a clamping manner, in order not to adversely affect the centering effect of the centering projection engaging in the centering opening.

To relieve the first guide and connection grooves of torques that can act on the hollow profiles, a supporting flange protrudes at a right angle respectively from the inner side of the first and second wall section in a preferred embodiment of the corner connector, which flange is provided with a supporting opening, in which a complementary supporting projection that is formed on a free end of the related guide and connection projection engages with a tight fit when the additional element is inserted into the base element. The supporting opening can pass through the supporting flange completely. The supporting projection can be cylindrical, for example.

If an additional element is to be capable of attachment, i.e. insertable, on two different sides of the base element, or if two additional elements are to be capable of attachment to a base element on opposing sides of the base element, then the first and the second wall section of the base element are each provided on their inner side with a second guide and connection groove, which extends from a lateral edge adjacent to the connecting edge parallel to the connecting edge that lies opposite the lateral edge from which the first guide and connection groove extends, wherein a related guide and connection projection of an additional element is insertable into the second guide and connection groove, in order to secure a further additional element flush on the base element in the fully inserted state to form a fourth wall section at a right angle to the first and second wall section. Each first guide and connection groove can merge seamlessly into the second guide and connection groove or can be formed separately from the second guide and connection groove.

To attach a hollow profile to a corner connector according to the invention, a tensioning element can be used, which in preferred configurations completely passes through the hollow profile longitudinally. Such a hollow profile tensioning element can be a rod, for example, the end sections of which are provided with an external thread to attach a tensioning nut. The hollow profile tensioning element can also be a threaded rod. In corner connectors according to the invention for hollow profiles that use a hollow profile tensioning element, each wall section is preferably provided with a through opening for such a hollow profile tensioning element. Each hollow profile can be braced in this way on two opposing corner connectors and attached securely to the corner connectors in this way. According to a development, such corner connectors, which have the supporting flange already described further above, can comprise a further through opening that extends through the supporting flange and aligns with the through opening for a hollow profile tensioning element in the additional element. In such an embodiment the additional element can be braced with the aid of the hollow profile tensioning element on the base element, more precisely on the supporting flange of the base element, in that a tensioning nut or the like is attached to the end of the hollow profile tensioning element, which extends through the through opening of the additional element and the other through opening of the supporting flange. The tensioning nut can be designed so that it is accessible from an outer side of the corner connector.

To simplify assembly, the through openings for the hollow profile tensioning elements are preferably executed so that they have a non-rotationally-symmetrical shape, thus cannot rotate in the through opening for the hollow profile tensioning element. For example, each through opening for a hollow profile tensioning element can have a circular basic shape, which has at least one flat portion to prevent rotation of the hollow profile tensioning element.

For more accurate and secure positioning of the hollow profiles on the corner connector, preferred embodiments of the corner connector according to the invention are characterized in that a hollow profile guide and centering projection protrudes from the outer side of the wall sections of the base element and each additional element substantially perpendicularly to the outer side at three corners of the respective wall section. By means of these three projections present on the outer side of each wall section, a hollow profile to be attached to the corner connector is located exactly and at the same time the end section of the hollow profile is stabilised, which improves the transfer of torques acting on the hollow profile to the corner connector. An outer surface of each hollow profile guide and centering projection preferably tapers conically towards its free end. A hollow profile that is placed onto the three projections thereby has more play initially, which makes positioning easier, and in the course of further positioning is guided increasingly more precisely, until when fully positioned a substantially play-free seat of the hollow profile on the three projections is set, which can also be designed alternatively as a clamping seat.

According to another preferred development, the hollow profile guide and centering projections are connected to one another along two lateral edges of a related wall section by connection projections, the outer surfaces of which are shaped complementarily to the inner profile shape of a hollow profile to be connected. The end section of a hollow profile placed onto the projections can be even better stabilized and supported in this way.

Finally, embodiments of the corner connector according to the invention, the wall sections of which are provided with a through opening for a hollow profile tensioning element, can have a supporting projection partially surrounding this through opening, which projection protrudes perpendicularly from the outer side of the related wall section of the base element and/or of each additional element and the inner circumferential surface of which is executed for the radial support of an outer surface of a hollow profile tensioning element take-up region of the hollow profile. A positioning projection can be added to this supporting projection, which positioning projection protrudes from the outer side of the respective wall section of the base element and/or the additional element close to a region of the through opening for the hollow profile tensioning element that is not surrounded by the supporting projection and the surface of which facing the through opening for the hollow profile tensioning element is executed to engage with the outer surface of the hollow profile tensioning element take-up region of the hollow profile. The hollow profile tensioning element take-up region of a hollow profile is thus positioned and supported from two opposing sides by means of such a positioning projection and the supporting projection.

In preferred configurations of the corner connector, each through opening for a hollow profile tensioning element is arranged close to that corner of a wall section at which no hollow profile guide and centering projection protrudes on the outer side.

The supporting projection and the positioning projection then ensure a reliable positioning and support of the hollow profile to be positioned in the region of this corner.

A preferred embodiment of a corner connector according to the invention is explained in greater detail below with reference to the enclosed schematic figures.

Figure 1:
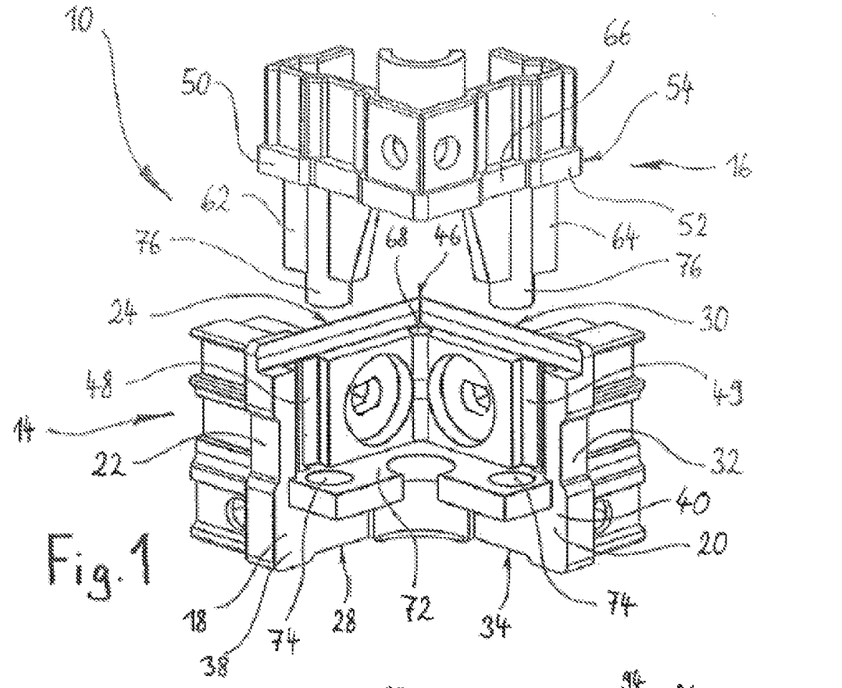
FIG. 1 shows a spatial representation of an embodiment of a corner connector according to the invention for hollow profiles in a state in which a base element and an additional element are still separate from one another.
Figure 2:
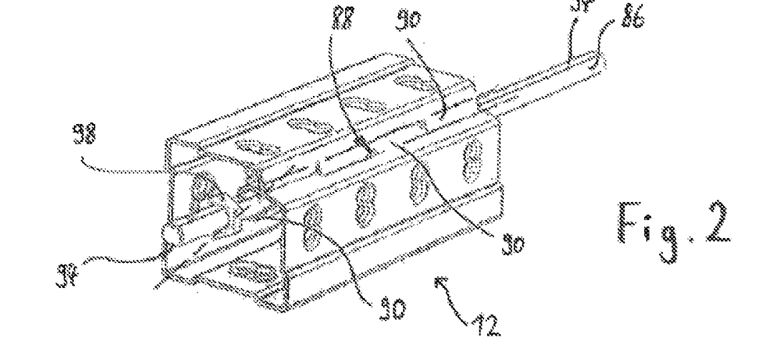
FIG. 2 shows a spatial representation of an end section of a hollow profile, several of which can be connected to one another with the aid of the corner connector from FIG. 1.

In FIG. 1, a corner connector generally designated 10 for hollow profiles is shown, wherein the corner connector 10 depicted in FIG. 1 is formed for the connection of three hollow profiles 12, one of which is shown in FIG. 2.

Figure 4:
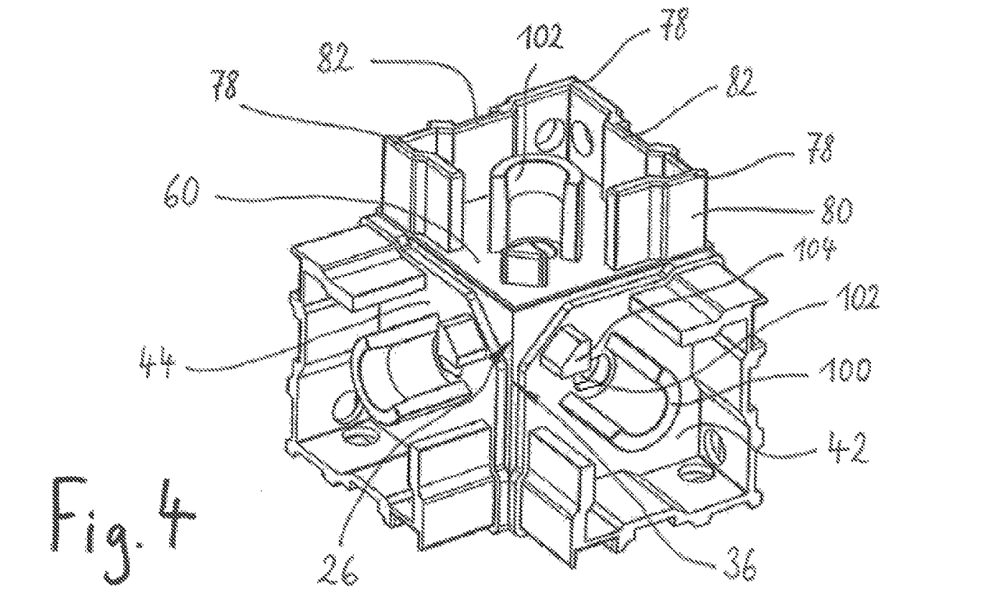
FIG. 4 shows a further spatial representation of the corner connector of FIGS. 1 and 3 from obliquely above and in an assembled state.

The corner connector 10 comprises two main components, a base element 14 and an additional element 16. The base element 14 is formed from a first wall section 18 and a second wall section 20, which each have four lateral edges 22, 24, 26, 28 and 30, 32, 34, 36, an inner side 38, 40 and an outer side 42, 44. Each wall section 18, 20 is substantially plate-shaped and has a rectangular, in the embodiment shown substantially square, basic shape. The first wall section 18 and the second wall section 20 are connected to one another at a right angle and in one piece at the lateral edges 26 and 36 (see FIG. 4), forming a connecting edge 46.

On its inner side 38, 40, each wall section 18, 20 is provided with a first guide and connection groove 48, 49, which extends from a lateral edge 24 and 30 adjacent to the connecting edge 46 in a direction parallel to the connecting edge 46.

The additional element 16 likewise has a substantially plate-shaped, rectangular (here substantially square) basic shape with four lateral edges 50, 52, 54, 56, an inner side 58 and an outer side 60.

Projecting substantially at a right angle from the inside 58 of the additional element 16 are two guide and connection projections 62, 64, which are formed complementarily to the first guide and connection grooves 48, 49 on their side facing the inner sides 38 and 40 of the wall sections 18, 20. In the embodiment shown, the first guide and connection grooves 48, 49 are formed as dovetail grooves and the guide and connection projections 62, 64 can be inserted in a direction parallel to the connecting edge 46 into the first guide and connection grooves 48, 49. In the fully inserted state, the additional element 16 is secured flush on the base element 14 (see FIG. 4) and the plate-shaped part of the additional element 16 forms a third wall section 66 arranged at a right angle to the first wall section 18 and to the second wall section 20. Due to the dovetail-shaped formation of the first guide and connection grooves 48, 49, the additional element 16 is held stably in the base element 14 and has as a sole degree of freedom its mobility parallel to the connecting edge 46 in a direction out of engagement with the base element 14.

For even more exact centering of the additional element 16 in the base element 14, a conically tapering centering opening 68 (see FIG. 1) is present in the latter close to the connecting edge 46 and running parallel to it, in which opening a conical centering projection 70 (see FIG. 3) that is aligned with the centering opening 68 and protrudes from the inner side 58 of the additional element 16, engages on insertion of the guide and connection projections 62, 64 into the guide and connection grooves 48, 49. In the embodiment shown, the centering projection 70 is formed as a truncated cone (and the central opening 68 complementary to this), but the centering projection can also be formed as a truncated pyramid or have a square cross section tapering towards the free end, wherein the centering opening is then adapted accordingly.

Figure 3:
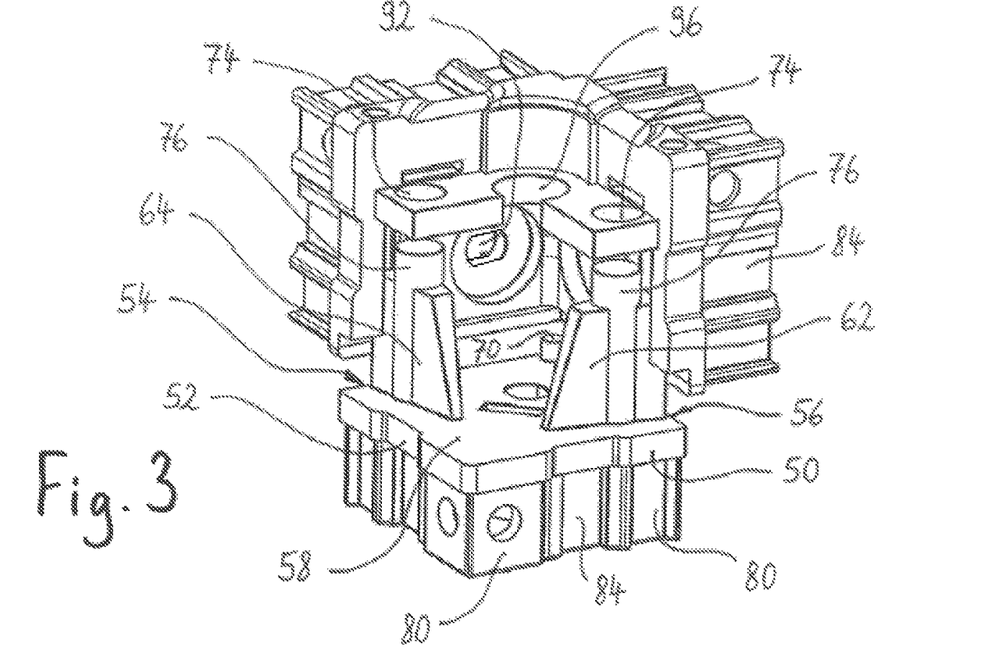
FIG. 3 shows a view similar to FIG. 1, but seen from another side and with the additional element partially introduced into the base element.

So that torques, which are exerted on an additional element 16 by a hollow profile 12 attached to the additional element 16, can be introduced into the base element 14 without causing a relative movement between the additional element 16 and the base element 14, a supporting flange 72 protrudes at a right angle from the inner sides 38, 40 of the wall sections 18, 20, which flange is provided with two support openings 74, into which a complementary supporting projection 76 formed on a free end of the related guide and connection projection 62, 64 engages with a tight fit on the insertion of the guide and connection projections 62, 64 into the guide and connection grooves 48, 49 (see also FIG. 3). By means of these supporting projections 76, which fit without play or slightly clamping into the support openings 74, the additional element 16 in interaction with the centering opening 68 and the guide and connection grooves 48, 49 is supported stably and precisely in the base element 14, so that relatively high torques can be introduced by the additional element 16 into the base element 14 without causing a relative movement between the additional element 16 and the base element 14.

For positioning and centering a hollow profile 12 on one of the wall sections 18, 20, 66, a hollow profile guide and centering projection 78 protrudes from the outer side of each of these wall sections at three corners respectively of the plate-shaped base body substantially vertically to the outer side of the respective wall section. In the embodiment shown, each hollow profile guide and centering projection 78 forms a right angle in cross section, which is arranged at the respective corner of the wall section and the outer surface 80 of which is substantially complementary to the inner surface of the hollow profile 12 in the related corner region. The outer surface 80 tapers conically in the embodiment shown towards the free end of the projection 78, due to which positioning of a hollow profile 12 is simplified and an end section of the hollow profile 12 is secured on full positioning on the projections 78 without play and if desired in a slightly clamping manner.

As shown, the hollow profile guide and centering projections 78 are connected to one another in the present embodiment along two lateral edges by connection projections 82, the outer surfaces 84 of which are executed complementarily to the inner profile shape of the hollow profile 12. The positioned hollow profile 12 is supported and stabilized in this way along a large part of its inner circumference by the projections 78 and 82.

FIG. 2 shows a hollow profile tensioning element 86 executed as a threaded rod, which extends through a hollow profile tensioning element take-up region 88, which is formed by tube-shaped bent lugs 90 of the hollow profile 12 that engage alternately in one another. Each wall section 18, 20, 66 of the corner connector 10 is provided with a through opening 92 for an end section of the hollow profile tensioning element 86. As shown, the cross section of the hollow profile tensioning element 86 is not completely circular, but has two flat portions 94. The shape of each through opening 92 corresponds to the cross section shape of the hollow profile tensioning element 86, due to which a rotation of the hollow profile tensioning element 86 led through a through opening 92 is prevented.

The supporting flange 72 is provided with a further through opening 96 for a hollow profile tensioning element 86, which aligns with the through opening 92 in the additional element 16. In this way a hollow profile tensioning element 86, which extends through the through opening 92 of the additional element 16 and further through the through opening 96 of the supporting flange 72, can be braced with the aid of a nut 98 (see FIG. 2), in that the nut 98 is tightened on the side of the supporting flange 72 facing away from the additional element 16 against the flange.

In a corner connector 10, which is conceived to take up hollow profiles 12, such as shown in FIG. 2, a supporting projection 100 that partially surrounds the through opening 92 for the hollow profile tensioning element 86 protrudes from the outer side of the wall sections 18, 20, 66, the inner circumferential surface 102 of which is executed for the radial support of an outer surface of the hollow profile tensioning element take-up area 88 formed by the lugs 90. For further positioning and support of the hollow profile tensioning element take-up region 88 of a hollow profile 12, a positioning projection 104 further protrudes (see FIG. 4) from the outer side of the wall sections 18, 20, 66 close to a region of the through opening 92 not surrounded by the supporting projection 100, the surface of which projection facing the through opening 92 is executed to engage with the outer surface of the hollow profile tensioning element take-up region 88.

Both the base element 14 and the additional element 16 are executed in the embodiment shown respectively in one piece as steel castings, but could also consist of cast aluminium or plastic castings. Alternatively, the base element 14 and the additional element 16 can be manufactured by machining of blanks.

Figure 5:
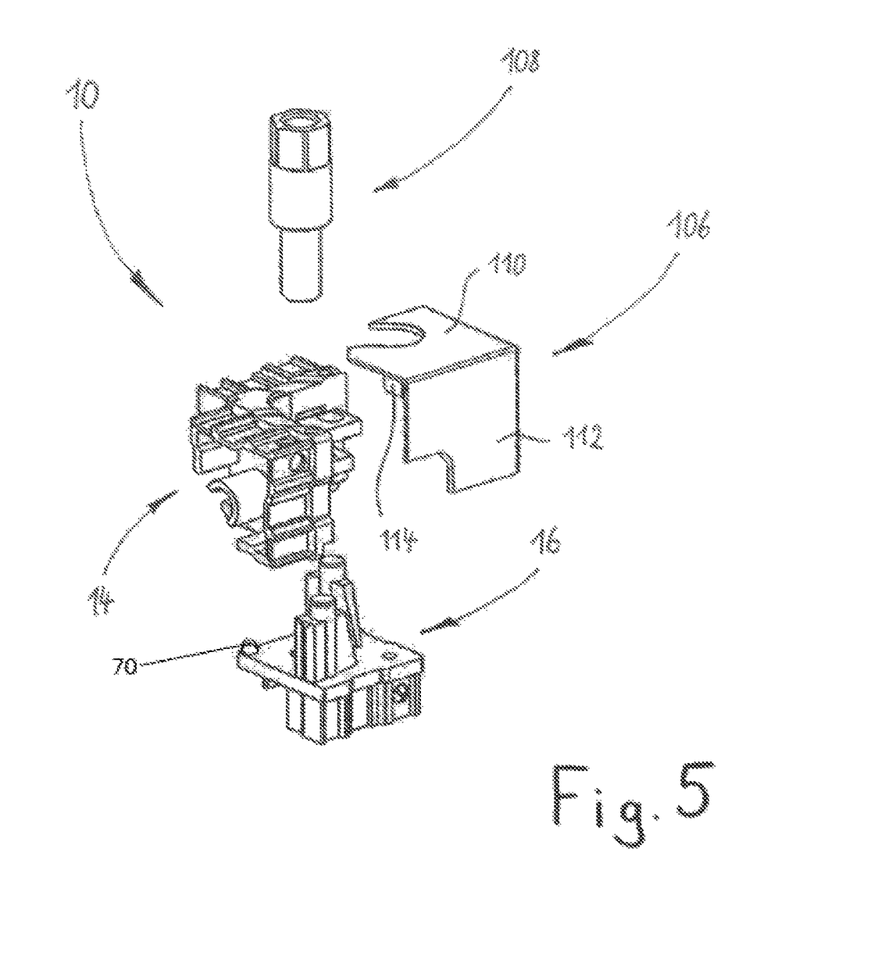
FIG. 5 shows an exploded spatial representation of the corner connector of FIGS. 1 and 3 with a covering cap.

In FIG. 5, an exploded representation is shown of the corner connector 10 with its base element 14, its additional element 16 and a covering cap 106 as well as a tensioning screw 108, which is used to tension a hollow profile tensioning element 86 arranged in a hollow profile 12 between two corner connectors 10.

The covering cap 106 consists of three wall sections 110, 112, 114 connected in one piece and at a right angle to one another. The covering cap 106 can consist of plastic and be executed for example as a plastic injection molded part, but can also consist of metal and be executed as a sheet metal part or a casting, for example.

The covering cap 106 is designed to be attached to the corner connector 10, for example by latching. In the state of attachment to the corner connector 10, the wall sections 110, 112, 114 of the covering cap 106 substantially continue the related outer surfaces of the hollow profiles 12, which have been connected to one another by means of a corner connector 10.

Figure 6:
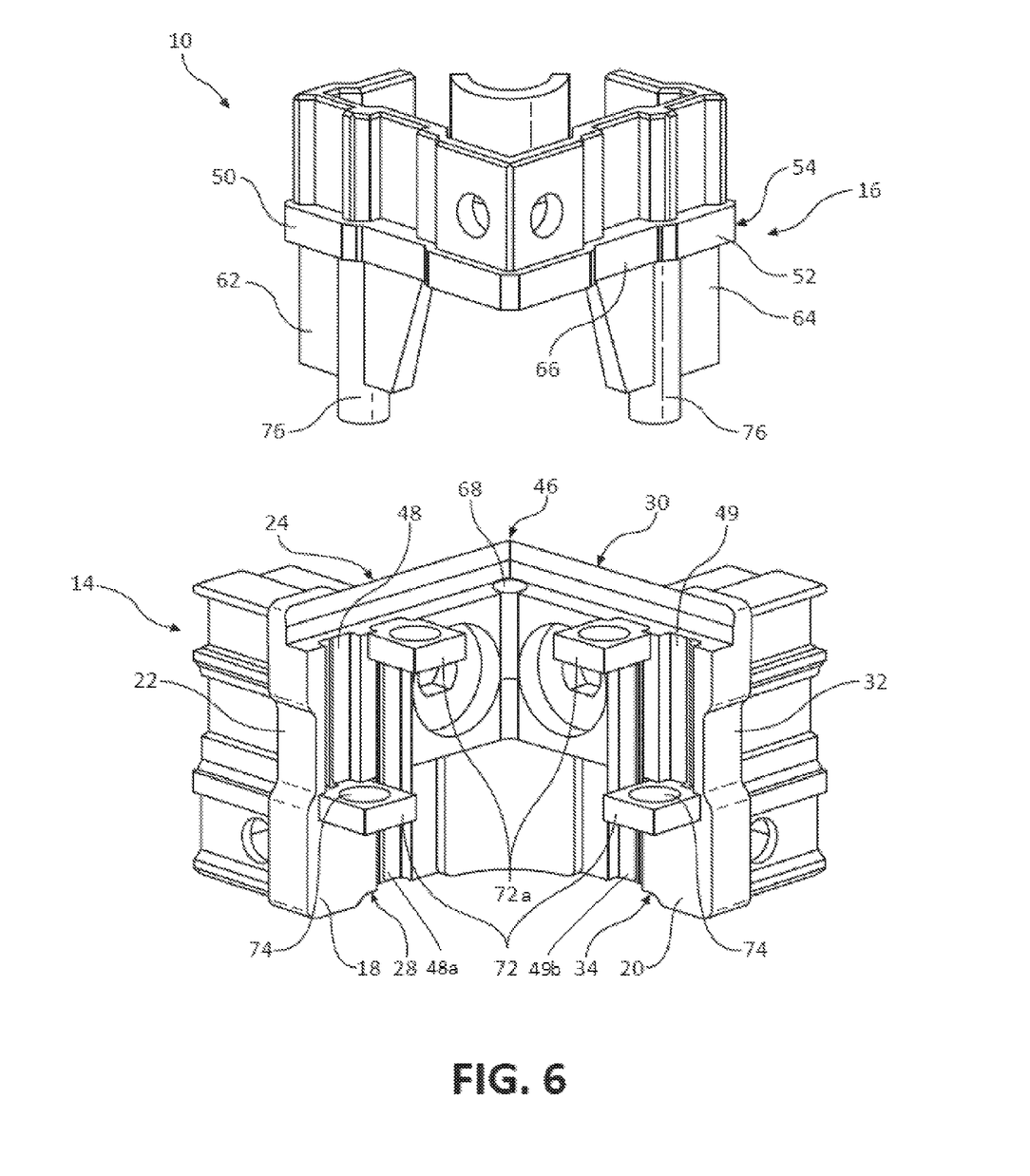
FIG. 6 shows a spatial representation of another embodiment of a corner connector according to the information for hollow profiles in a state in which a base element and an additional element are still separate from one another.

With reference to FIG. 6, as noted above, if an additional element is to be capable of attachment, i.e. insertable, on two different sides of the base element 14, or if two additional elements are to be capable of attachment to a base element 14 on opposing sides of the base element 14, then the first and the second wall section 18, 20 of the base element 14 are each provided on their inner side 38, 40 with a second guide and connection groove 48a, 49a which extends from a lateral edge adjacent to the connecting edge 46 parallel to the connecting edge 46 that lies opposite the lateral edge from which the first guide and connection groove 48, 49 extends, wherein a related guide and connection projection of an additional element is insertable into the second guide and connection groove 48a, 49a, in order to secure a further additional element flush on the base element 14 in the fully inserted state to form a fourth wall section at a right angle to the first and second wall section. Each first guide and connection groove 48, 49 can merge seamlessly into the second guide and connection groove 48a, 49a or can be formed separately from the second guide and connection groove 48a, 49a.

The invention claimed is:

1. A corner connector for hollow profiles, comprising:
   a base element formed from a first and a second plate connected at a right angle along a connecting edge to form a corner, wherein the first and the second plates each include a first guide and connection groove and a supporting flange, the first guide and connection grooves each formed in a face of a corresponding one of the first and the second plates and each extending along a respective insertion axis parallel to the connecting edge, and the supporting flanges each extending at a right angle from the face in which the first guide and connection groove is formed and including a support opening; and
   at least one substantially plate-shaped, rectangular additional element with four lateral edges, two guide and connection projections, and supporting projections, the two guide and connection projections being complementary to the first guide and connection grooves and configured to be inserted into the first guide and connection grooves along the respective insertion axes and in a fully inserted state to secure the additional element flush on the base element to form a wall section, which is arranged at a right angle to the first and second plates, and the support openings configured to engage a corresponding one of the support projections with a tight fit on insertion of the guide and connection projections into the first guide and connection grooves.

2. The corner connector according to claim 1, wherein the first guide and connection grooves are formed with an undercut.

3. The corner connector according to claim 1, wherein a centering opening is present in the base element close to the connecting edge, which opening runs parallel to the connecting edge, in which opening a conical centering projection, which is aligned with the centering opening and protrudes from the inner side of the additional element, engages on insertion of the guide and connection projections of the additional element into the first guide and connection grooves of the base element.

4. The corner connector according to claim 1, wherein the first and second plates are each provided with a second guide and connection groove in each case, which extends from a lateral edge adjacent to the connecting edge, which lateral edge is opposite to a lateral edge from which the first guide and connection groove extends, parallel to the connecting edge and into which a related guide and connection projection of a further additional element is insertable, in order to, in the fully inserted state, secure the further additional element flush on the base element.

5. The corner connector according to claim 1, wherein the wall section and each plate is provided with a through opening for a hollow profile tensioning element.

6. The corner connector according to claim 5, wherein a further through opening extends through the supporting flange, which opening aligns with the through opening for a hollow profile tensioning element in the additional element.

7. The corner connector according to claim 5, wherein the through openings for a hollow profile tensioning element have a non-rotationally-symmetrical shape.

8. The corner connector according to claim 5, wherein protruding from an outer side of the plates of the base element and from an outer side of the wall section of each additional element is a supporting projection that partially surrounds the through opening for a hollow profile tensioning element, and an inner circumferential area of which the supporting projection is shaped to provide radial support of an outer surface of a hollow profile tensioning element take-up region of a hollow profile.

9. The corner connector according to claim 8, wherein protruding from the outer side of the plates of the base element and from the outer side of the wall section of each additional element, close to a region of the through opening for a hollow profile tensioning element that is not surrounded by the supporting projection, is a positioning projection, a surface of which facing the through opening for a hollow profile tensioning element is shaped to engage with the outer surface of a hollow profile tensioning element take-up region of a hollow profile.

10. The corner connector according to claim 8, wherein each through opening for a hollow profile tensioning element is arranged close to a corner of a plate at which no hollow profile guide and centering projection protrudes on the outer side.

11. The corner connector according to claim 1, wherein from an outer side of the plates of the base element and from an outer side of the wall section of the additional element at three corners, a hollow profile guide and centering projection protrudes substantially perpendicularly to the outer side.

12. The corner connector according to claim 11, wherein an outer surface of each hollow profile guide and centering projection tapers to its free end.

13. The corner connector according to claim 11, wherein the hollow profile guide and centering projections are connected to one another along two lateral edges by connection projections, the outer surfaces of which are shaped complementarily to the inner profile shape of a hollow profile to be connected.

14. The corner connector according to claim 1, wherein at least one of the base element and the additional element is a casting.

15. The corner connector according to claim 1, wherein the first guide and connection grooves are formed with an undercut in the shape of a dovetail groove.

\* \* \* \* \*